Sept. 22, 1970 — E. R. JACOBSEN — 3,529,696

ORCHARD SCAFFOLD

Filed Oct. 14, 1968 — 3 Sheets-Sheet 1

EDWARD R. JACOBSEN
INVENTOR

Huebner & Worrel
ATTORNEYS

Sept. 22, 1970     E. R. JACOBSEN     3,529,696
ORCHARD SCAFFOLD
Filed Oct. 14, 1968     3 Sheets-Sheet 2
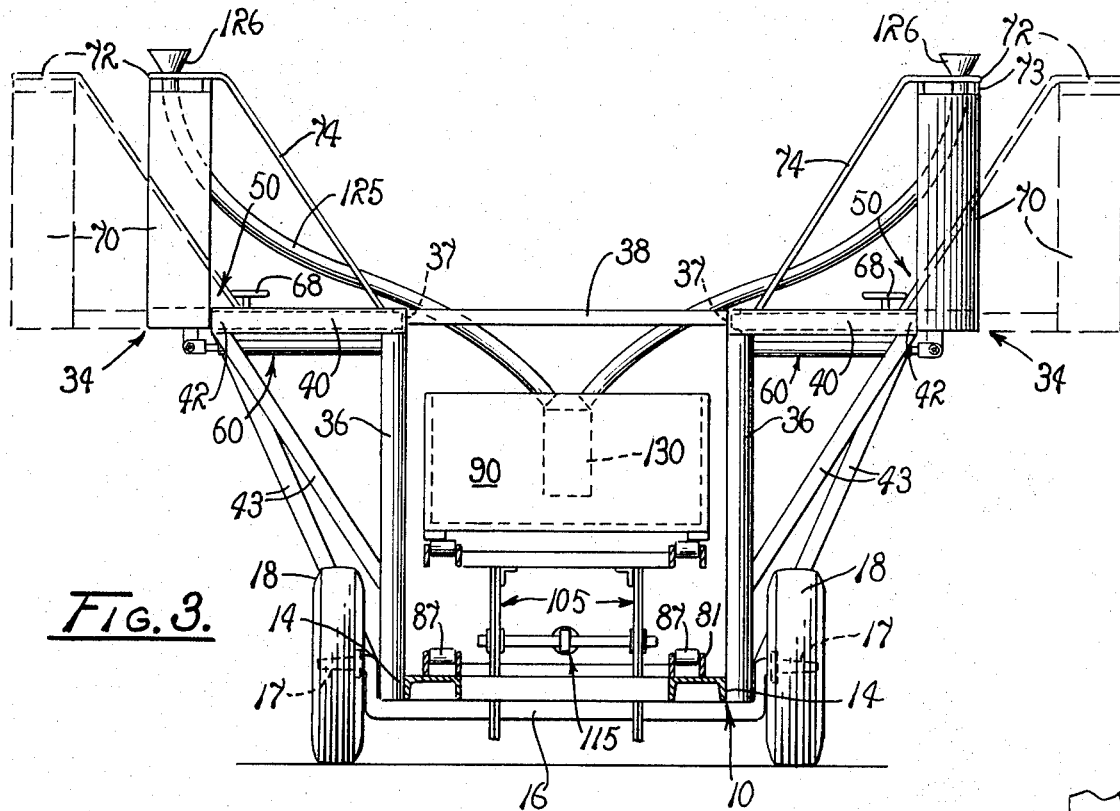
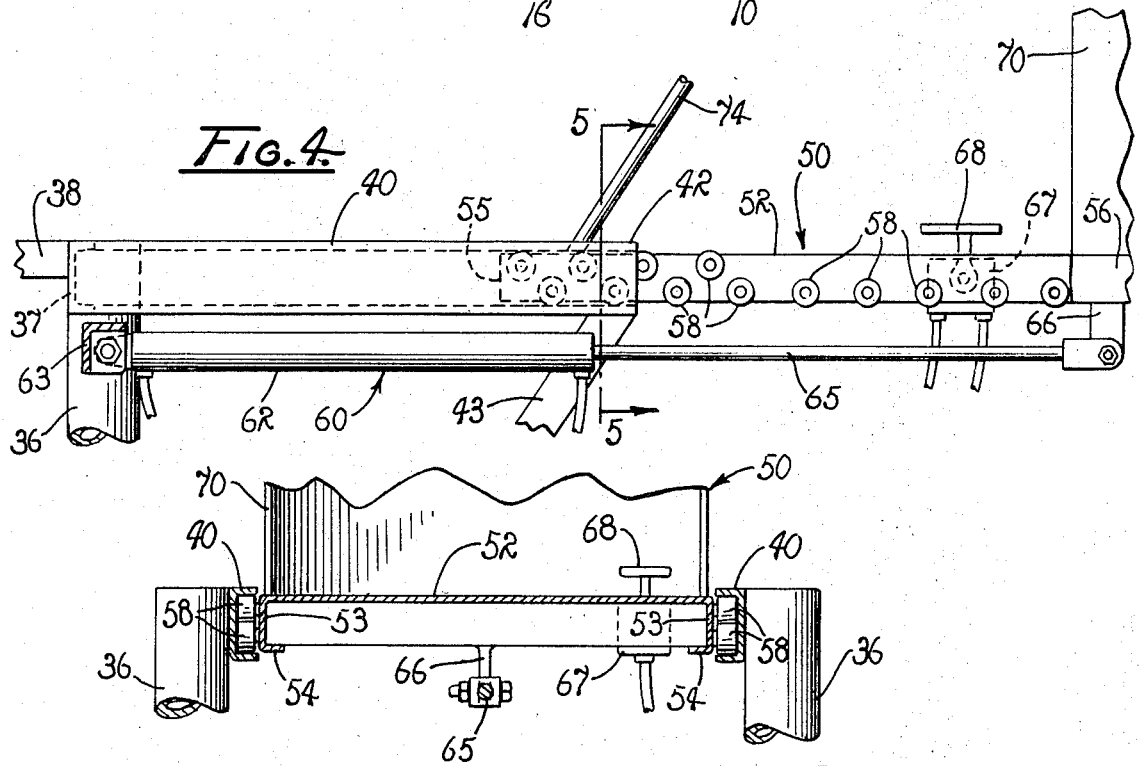
EDWARD R. JACOBSEN
INVENTOR
Huebner & Worrel
ATTORNEYS Sept. 22, 1970     E. R. JACOBSEN     3,529,696
ORCHARD SCAFFOLD
Filed Oct. 14, 1968     3 Sheets-Sheet 3
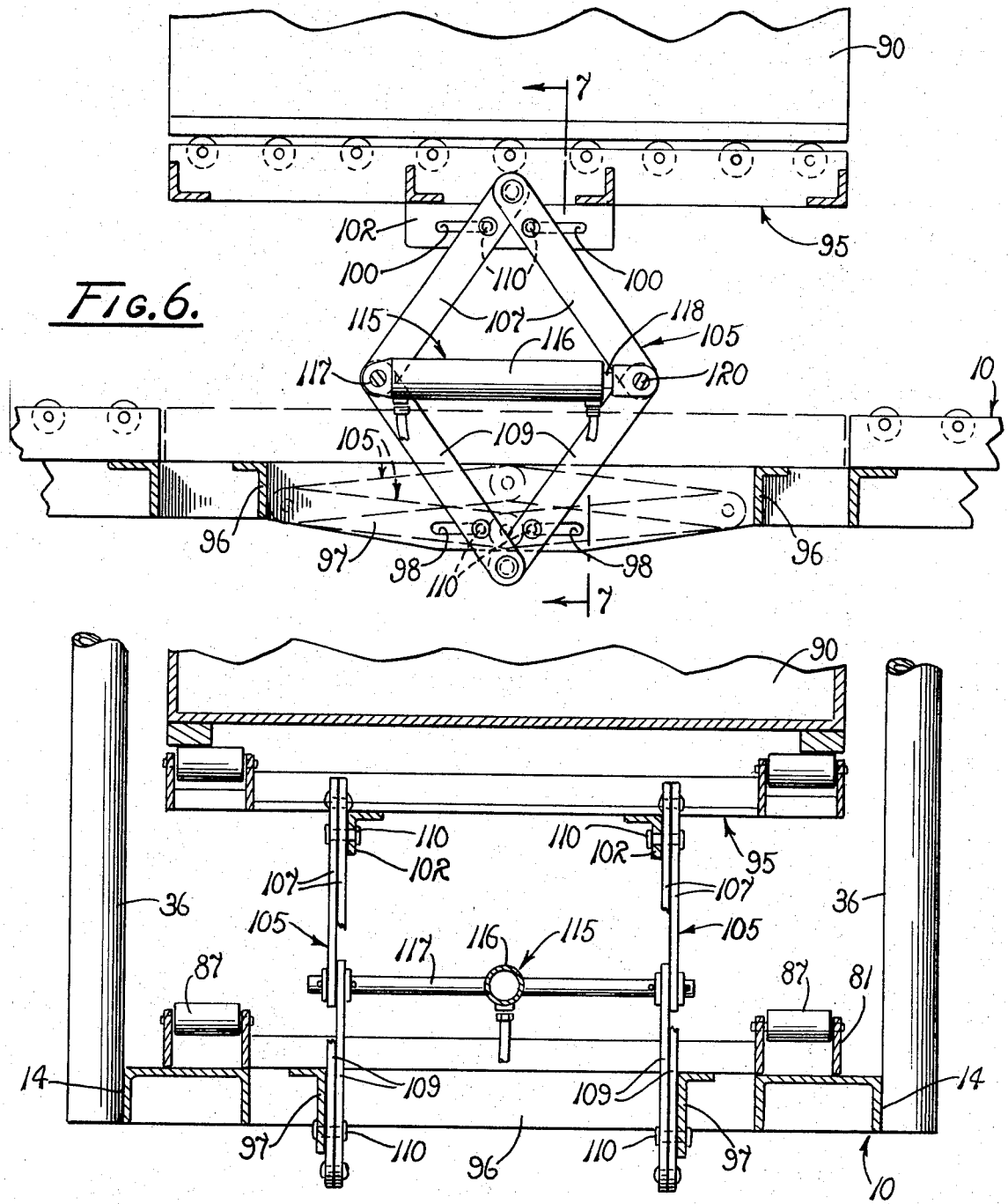
EDWARD R. JACOBSEN
INVENTOR
Huebner & Worrel
ATTORNEYS

United States Patent Office 3,529,696
Patented Sept. 22, 1970

3,529,696
ORCHARD SCAFFOLD
Edward R. Jacobsen, P.O. Box 447,
Tehachapi, Calif. 93561
Filed Oct. 14, 1968, Ser. No. 767,131
Int. Cl. E04g 1/20
U.S. Cl. 182—129          8 Claims

ABSTRACT OF THE DISCLOSURE

An orchard scaffold providing a mobile frame adapted for earth traversing movement in a predetermined forward direction of travel between adjacent rows of trees in an orchard, said scaffold having a plurality of elevationally stepped picking and pruning stations individually disposable adjacent to progressively upwardly spaced portions of the trees during said movement of the frame between the rows and a plurality of worker support platforms individually mounted on the frame at said picking and pruning stations for selective reciprocal movement relative to the frame laterally of said direction of frame travel inwardly and outwardly of the trees to reach the innermost portions thereof and to avoid striking obstructive portions of the trees so as to minimize fruit droppage and limb breakage.

BACKGROUND OF THE INVENTION

With the advent of hedge row planting and pruning of trees in orchards, the prior picking and pruning platforms have become virtually obsolete. This type of planting spaces the trees closely together in the rows so that there is a substantially continuous wall of fruit-bearing branches along the rows. Such systems require somewhat thin or short-branched trees since the pickers and pruners working from conventional non-extendible platforms cannot reach much beyond a depth of three feet. This, of course, limits the total bearing width of the trees to about six feet, which is substantially less than the maximum spread of the trees if permitted to grow to their full size. Thus, productivity is arbitrarily restricted because of picking and pruning problems of access.

The hedge row system of planting is employed more readily to adapt the orchards to mechanized pruning and picking operations and to achieve more efficient utilization of land. It is desirable that a machine be provided which will enable the trees to be pruned and picked to their full depth in a single pass of the machine along the rows. Heretofore, picking and pruning scaffolds have been provided with circular or semicircular worker support platforms for disposing a plurality of workmen about the trees. These, of course, are not suitable for hedge row planted orchards since there is no spacing between the trees in the rows to accommodate such platforms. Mobile scaffolds having elongated boom arm supported platforms have been utilized in the past in spaced tree orchards where they can be used to advantage but with hedge row planted orchards, their extensive maneuverability is not needed. Such mobile scaffolds require complicated control systems which are expensive to maintain and difficult to operate by anyone other than the most skilled workmen. They usually support only a single workman who must continually reposition the platform in order to cover all portions of the trees.

The prior platforms have also provided fruit delivery chutes or tubes for gravitationally discharging the picked fruit into collector bins located on the machine adjacent to the ground. When the platform is disposed adjacent to the top of the trees, the fruit must fall a considerable distance which results in substantial bruising and loss of profits to the grower.

SUMMARY OF THE INVENTION

Accordingly, it is an object of the present invention to provide an improved orchard scaffold particularly adapted for use in hedge row planted orchards.

Another object is to provide such an improved orchard scaffold which imposes substantially no restrictions on the size of the trees so as to permit them their maximum bearing surfaces.

Another object is to provide an improved orchard scaffold of the character described which is adapted to be motivated between adjacent rows of trees in an orchard and which is capable of supporting a plurality of workmen thereon for concurrently attending the trees in both rows on opposite sides of the scaffold.

Another object is to provide an orchard scaffold which is capable of adjusting to different tree row spacings.

Another object is to provide an orchard scaffold which has a plurality of elevationally stepped picking and pruning stations from which all portions of the trees are accessible during movement of the scaffold in a single pass along the rows.

Another object is to provide an orchard scaffold which has a plurality of extendable-retractable worker support platforms individual to each of said elevationally spaced picking and pruning stations for extension into the trees to provide access to the innermost portions thereof and which are sufficiently maneuverable to avoid striking the limbs of the trees to minimize limb breakage and fruit droppage.

Another object is to provide an orchard scaffold which minimizes damage to the fruit being picked by incorporating a fruit collector bin conveyor on the scaffold with the bins receiving fruit through a plurality of delivery tubes individual to the picking stations.

Another object is to provide such an orchard scaffold in which the bin conveyor has an elevatable section which is positionable adjacent to the uppermost picking stations, so as to minimize the distance the picked fruit must fall.

Other objects and advantages of the present invention will subsequently become more clearly apparent upon reference to the following description and accompanying drawings.

BRIEF DESCRIPTION OF THE DRAWINGS

FIG. 3 is a somewhat enlarged transverse vertical section through the orchard scaffold, taken on line 3—3 of FIG. 1, showing the uppermost picking station and the elevated collector bin conveyor section associated therewith.

FIG. 4 is a somewhat further enlarged fragmentary side elevation of the worker support platform at one of the picking and pruning stations with the platform disposed in its fully extended position.

FIG. 5 is a somewhat enlarged fragmentary transverse vertical section through the worker support platform, taken on line 5—5 of FIG. 4.

FIG. 6 is a somewhat enlarged longitudinal central section through the collector bin conveyor with the bin elevating section thereof disposed in an upwardly extended position.

FIG. 7 is a somewhat enlarged transverse vertical section through the bin conveyor, the bin elevating section and a support linkage therefor, taken generally on line 7—7 of FIG. 6.

DESCRIPTION OF THE PREFERRED EMBODIMENT

Figure 1:
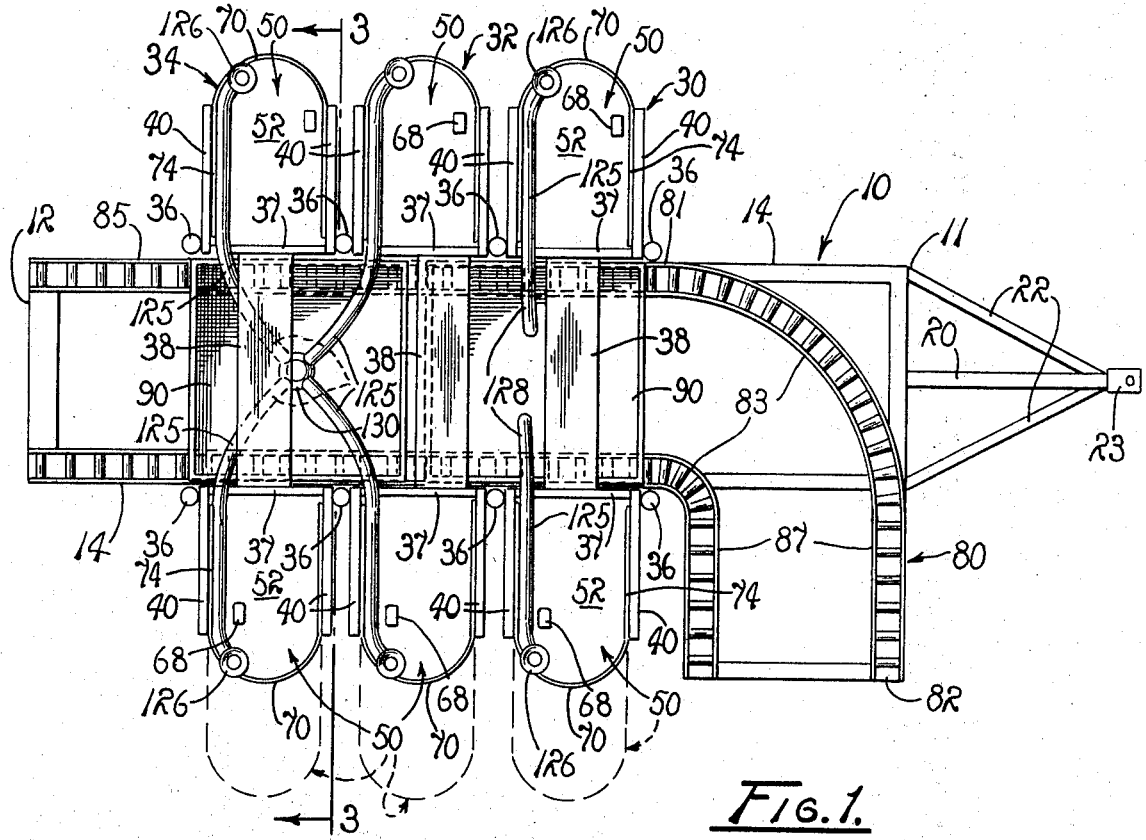
FIG. 1 is a top plan view of an orchard scaffold embodying the principles of the present invention providing a plurality of worker support platforms disposed in their retracted full line positions with their extended positions shown in dashed lines.

Referring more particularly to the drawings, an orchard scaffold embodying the principles of the present invention provides an elongated substantially rectangular lower main frame 10 having predetermined forward and rearward ends 11 and 12, respectively, and opposite sides 14. An elongated transversely disposed axle beam 16 is mounted beneath the frame between the opposite sides 14 and provides laterally outwardly extended spindle ends 17. A pair of wheels 18 are rotatably mounted on the spindles rollably to support the frame for earth traversing movement. An elongated draft tongue 20 is longitudinally extended from the forward end 11 of the frame and is strengthened by a pair of diagonal braces 22. The tongue has a forward pin receiving end 23 for reasable connection to the hitch of a suitable prime mover such as a tractor or the like, not shown, for motivating the frame in earth traversing movement between adjacent rows of trees in an orchard.

Figure 2:
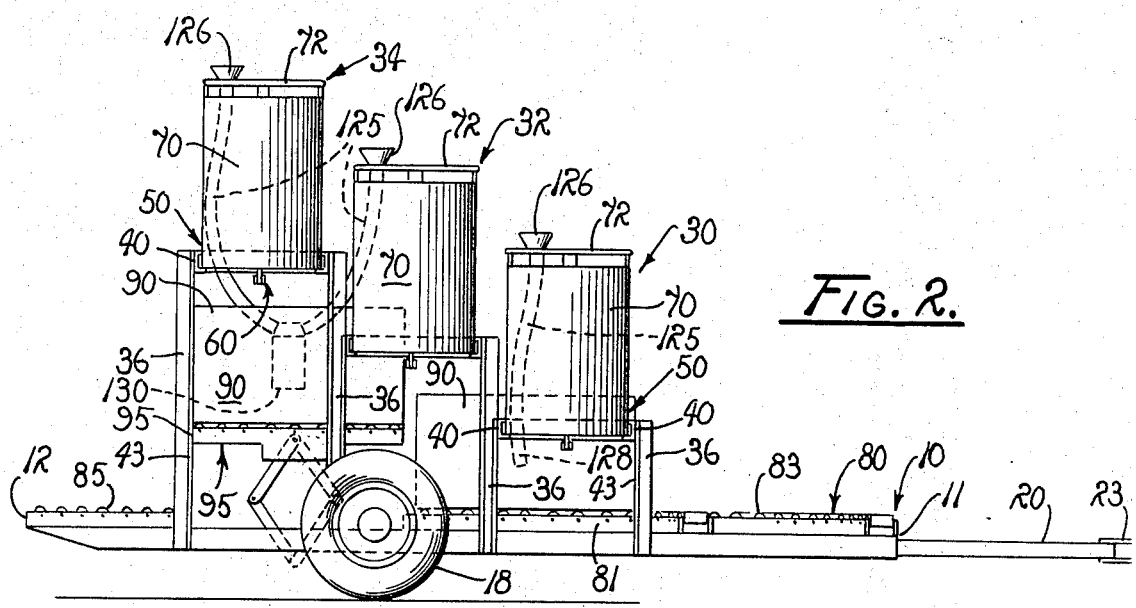
FIG. 2 is a side elevation of the orchard scaffold of FIG. 1 showing the elevationally stepped relationship between the platforms.

As best shown in FIG. 2, a plurality of elevationally stepped picking and pruning stations, including a lower station 30, an intermediate station 32, and an upper station 34, are disposed upon the lower main frame 10. The picking and pruning stations are individually supported in the described elevationally stepped relation by a superstructure upwardly extended from the lower main frame and including a plurality of longitudinally spaced substantially upright support posts 36 of progressively greater length from the lower to the upper stations.

As best shown in FIG. 1, there are two laterally spaced picking stations at each elevational level which are oppositely laterally outwardly extended from their adjacent sides 14 of the frame 10. It will also be noted that the support posts 36 between the intermediate picking and pruning station 32 and the upper and lower stations provide a common support therebetween. A channular header beam 37 is disposed in interconnecting relation between the upper ends of the support posts 36 at each of the picking and pruning stations. An elongated beam or plank 38 is disposed in transversely extended interconnecting relation between the header beams 37 on the opposite sides of the frame to strengthen the picking and pruning station superstructure and to serve as a walkway between the picking and pruning stations at each elevational level. Such superstructure also provides a pair of outwardly extended spaced substantially parallel channular platform support tracks 40 outwardly extended from the upper ends of each of the support posts 36. The support tracks include outer ends 42 which are individually supported by a plurality of angular braces 43 downwardly extended for connection to the support posts 36.

A plurality of worker support platforms, generally indicated by the reference numeral 50, are individually mounted on the support tracks 40 at each of the picking and pruning stations 30, 32 and 34. Each of the platforms provides an upper floor 52 having depending opposite side walls 53 and lower inwardly extended flanges 54. The platform further provides an inner end 55 and an opposite outer arcuate end 56. A pair of upper and lower rows of rollers 58 are rotatably mounted on each of the side walls 53 of the platforms for rolling engagement within their associated support tracks 40 to permit substantially frictionless longitudinal travel of the platforms inwardly and outwardly of their respective picking and pruning stations. Such movement is powered by an hydraulic jack 60 having a cylinder end 62 mounted on a cross member 63 disposed between the associated support posts 36. The jack includes an extendable-retractable piston rod end 65 connected at its outer end to a bracket 66 disposed in depending relation from the outer end 56 of the platform. The jack is controlled by an hydraulic valve 67 having a foot actuated treadle member 68 disposed above the floor 52 of the platform. The valve and hydraulic jack are connected by suitable hydraulic hoses to the hydraulic pumping system on the prime mover, not shown. An elongated semicylindrical branch deflecting and worker constraining guard 70 is mounted in substantially upright position at the outer arcuate end 56 of the platform. A guard support rail 72 is disposed in upwardly spaced relation from the upper edge of the guard 70 and is connected thereto by a plurality of short posts 73 and provides opposite angularly disposed support legs 74 connected to the platform adjacent to its inner end 55.

An elongated fruit collector bin conveyor 80 is mounted in generally longitudinally extended relation upon the lower main frame 10. The conveyor provides a main section 81 including a forwardly disposed bin receiving end 82 laterally outwardly extended from one side of the frame at its forward end 11, an intermediate arcuately curved portion 83 and a rearwardly disposed bin discharge end 85 at the rearward end 12 of the frame. As best shown in FIGS. 1 and 7, the conveyor is constructed of a pair of spaced substantially parallel roller tracks 87 for supporting and rollably conveying a plurality of fruit collector bins 90 rearwardly between the picking and pruning stations 30, 32 and 34.

As best shown in FIGS. 6 and 7, the conveyor 80 provides a bin elevating section 95 adjacent to the rearward end 12 of the frame 10. The bin elevating section 95 is supported on a pair of angle iron members 96 laterally extended between the opposite sides 14 of the frame 10 in longitudinally spaced substantially parallel relation. A pair of spaced linkage mounting plates 97 are disposed in longitudinally extended interconnecting relation between the angle iron members 96 in inwardly spaced substantially parallel relation to the opposite sides of the frame. A pair of elongated longitudinally spaced slots 98 are formed in each of the mounting plates substantially midway between the angle iron members 96. A pair of substantially identical slots 100 are formed in a pair of elongated upper mounting plates 102 disposed in longitudinally extended depending relation from the bin elevating section 95 of the conveyor 80.

A double toggle linkage, generally indicated by the reference numeral 105, is interposed the frame 10 and the bin elevating section 95 for raising and lowering the same between a lower position disposed substantially in coplanar relation with the conveyor, as shown in dashed lines in FIG. 6, and an upwardly disposed position, as shown in full lines, for positioning a collector bin adjacent to the upper and intermediate picking and pruning stations 34 and 32, as shown in FIG. 2. The toggle linkage includes a pair of upper links 107 and a pair of lower links 109 which are pivotally interconnected at their adjacent ends. The opposite ends of the upper and lower links are respectively pivotally connected to each other with each link mounting a guide pin 110 for extension through their respectively associated slots 98 and 100 in the mounting plates 97 and 102. An hydraulic jack 115 is extendably-retractably mounted between the pivotal connections of the adjacent ends of the upper and lower links. The jack provides a cylinder end 116 which is pivotally mounted on a pivot rod 117 for the links and an opposite piston rod end 118 pivotally mounted on a pivot rod 120 at the pivot connection between the opposite ends of the upper and lower links.

A plurality of fruit transfer tubes 125 of flexible material are mounted on the frame and are individually associated with each of the picking and pruning stations 30, 32 and 34. Each of the tubes has an upper funnel type fruit receiving end 126 disposed above its associated guard rail 72 on the worker support platforms 50. The fruit transfer tubes associated with the lower picking and pruning station 30 individually terminate in lower discharge ends 128 which are adapted to be extended into a fruit collector bin disposed upon the main section of the conveyor 80 immediately ahead of the elevating section 95. The fruit transfer tubes at the intermediate and upper picking and pruning stations are connected to a common discharge chute 130 which is extendable into the collector bin supported by the elevating section of the conveyor with the elevated bin minimizing the distance that the fruit has to gravitate during the picking operation.

OPERATION

The operation of the described embodiment of the subject invention is believed to be clearly apparent and is briefly summarized at this point. Upon movement of the mobile scaffold of the present invention between a row of trees in an orchard, a plurality of fruit collector bins are disposed upon the conveyor 80 by placing them upon the bin receiving end 82 thereof and shoving them rearwardly until the first bin is disposed congruently upon the bin elevating section 95. Suitable hydraulic controls, not shown, on the prime mover are actuated to contract the hydraulic jack 115 in order to unfold the toggle linkage 105 from its dashed line, collapsed position of FIG. 6, to the fully extended full line position to elevate the collector bin to its upper position of FIG. 2. During such linkage movement, the adjacent pivotal ends of the upper and lower links move toward each other with the pins 110 sliding through their respective slots 98 and 100 to maintain the elevating section and the bin in a substantially horizontal position throughout the elevating operation.

The worker support platforms 50 are initially disposed in their retracted full line positions of FIG. 3 upon the initial entry of the picking scaffold between the rows of trees in an orchard. During the pruning operation where only the outer ends of the branches of the trees in the rows are to be removed, the platforms can be adjusted with respect to the particular spacing of the adjacent rows of trees. The platforms can be simultaneously adjusted by actuation of a suitable control valve, not shown, on the prime mover or alternatively the platforms may be individually adjusted by the workmen thereon by actuation of the foot treadle 68 of the valve 67 on each platform. This is particularly useful during the picking operation when it is desirable that each workman move inwardly and outwardly of the branches of the trees in the rows so as to reach the innermost portions thereof and to avoid striking obstructive branches to preclude breaking the branches or knocking the fruit from the limbs during movement along the rows.

During such picking operation, the workmen place the picked fruit into the upper funnel ends 126 of the fruit transfer tubes 125 for gravitational descent therethrough and ultimate discharge into the appropriate collector bin 90 on the conveyor 80. It will be noted that by virtue of the elevating section 95 of the conveyor, the collector bin disposed thereon is positioned so that the fruit being delivered thereto does not have to fall any farther than the fruit being discharged from the fruit transfer tubes at the lower picking and pruning station 30. It is also significant that when the elevating section 95 of the conveyor is disposed in its raised position that it provides a positive stop for the next succeeding bin adjacent to the lower picking station to preclude inadvertent removal or rearward travel of the collector bin from the conveyor. Also, during reciprocation of the worker support platforms 50, the semicylindrical guard walls 70 easily slide between the branches in deflecting relation to preclude breakage and to permit ease of movement into and out of the foliage of the trees. Furthermore, the operation of the treadle control valve for the powered reciprocation of the platforms permits both of the workman's hands to be free for picking during such movement of the platforms into and out of the branches of the tree. The elevationally stepped arrangement of the picking stations permits substantially all portions of the tree to be reached from the scaffold during a single pass along the rows.

After the collector bins on the conveyor are filled, the hydraulic jack 115 is extended in order to collapse the toggle linkage 105 to lower the elevating section 95 to its coplanar dashed line position of FIG. 6. The bins are then free to be rearwardly conveyed and discharged from the rearward end 85 of the conveyor onto the ground or onto the forks of a suitable transport truck for their removal from the orchard. Additional bins are then simultaneously introduced onto the forward bin receiving end of the conveyor which, by virtue of its lateral extension from the scaffold, can be accomplished without interfering with the forward movement thereof between the rows of trees. The elevating section upon receiving a subsequent collector bin thereon, is then re-elevated to the position shown in FIG. 2 and the picking operation continued with a minimum of delay.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An orchard scaffold comprising mobile frame adapted for earth traversing movement in a predetermined forward direction of travel between adjacent rows of trees in an orchard including a plurality of elevationally stepped picking and pruning stations on the frame individually disposable adjacent to progressively upwardly spaced portions of the trees during said movement of the frame between the rows, and a plurality of worker support platforms individually mounted on the frame at said picking and pruning stations for selective reciprocal movement relative to the frame laterally of said direction of frame travel inwardly and outwardly of the trees to reach the inenrmost portions thereof and to avoid striking obstructive portions of the trees so as to minimize fruit droppage and limb breakage.

2. The scaffold of claim 1 in which said frame includes opposite sides with laterally opposed sets of said support platforms being located at each elevationally spaced picking and pruning station individually along the opposite sides of the frame with said lateral movement of the platforms accommodating various spacings of said adjacent rows of trees in the orchards.

3. The scaffold of claim 2 including powered extendible-retractable means disposed in interconnecting relation between said platforms and the frame at their respective picking and pruning stations, and foot operated control means borne by each of the platforms in controlling relation to their respective powered means on the platforms.

4. The scaffold of claim 3 in which said frame provides predetermined forward and rearward ends, and including a substantially longitudinally extended bin conveyor on the frame having a bin rceeiving end adjacent to said forward end of the frame and a bin discharge end at said rearward end of the frame.

5. The scaffold of claim 4 including article transfer means on the frame having upper article receiving ends adjacent to each of said picking and pruning stations and lower article discharge ends disposed above said bin conveyor.

6. The scaffold of claim 5 in which said bin conveyor has a main section and a bin elevating section movable between a lower position coplanar with the main section and an upper position disposed adjacent to the uppermost picking and pruning station to minimize the distance said articles must fall through said article transfer means.

7. An orchard scaffold comprising an elongated mobile frame having predetermined forward and rearward ends and opposite sides adapted for earth traversing movement in a predetermined forward direction of travel between adjacent rows of trees in an orchard and including a plurality of laterally opposed sets of elevationally stepped picking and pruning stations along said sides of the frame and being individually disposable adjacent to progressively upwardly spaced portions of the trees during said movement of the frame between the rows, a plurality of worker support platforms individual to said picking and pruning stations, a plurality of powered extendable-retractable jacks individually disposed in interconnecting relation between each of said plaftorms and the frame at their respetive picking and pruning stations, a foot operated control valve borne by each of the platforms having controlling connection to its association jack on the platform, an elongated roller conveyor mounted on the frame in longitudinally extended relation between and somewhat below the picking and pruning stations along the sides of the frame for supporting and conveying a succession of fruit picking bins therealong, a plurality of elongated fruit transfer tubes of flexible material having upper fruit receiving ends individually disposed at said picking and pruning stations and opposite lower fruit discharge ends extendible into such fruit picking bins on the conveyor, and said conveyor having an elevating section disposed adjacent to said rearward end of the frame for raising said bins upwardly adjacent to the uppermost picking and pruning stations to minimize the distance fruit must fall through said fruit transfer tubes.

8. The orchard scaffold of claim 7 including powered linkage means supporting said bin elevating section of the bin conveyor on the frame providing pairs of pivotally interconnected upper and lower links, pairs of elongated slots in said frame and in said elevatable section, a plurality of pins individually slidably extended through said slots and carried by the adjacent links to stabilize the bin elevating section, and a powered jack interposed said pairs of upper and lower links and being contractable to raise the bin elevating section with the links disposed in substantially rectangular arrangement and being collapsible to lower the bin elevating section upon extension of said powered jack.

References Cited

UNITED STATES PATENTS

| | | | |
|---|---|---|---|
| 2,450,812 | 10/1948 | Ray. | |
| 3,085,650 | 4/1963 | Merk | 182—148 XR |
| 3,352,380 | 11/1967 | Barney | 182—62.5 XR |
| 3,437,174 | 4/1969 | Coblentz | 214—83.1 XR |

KENNETH DOWNEY, Primary Examiner

U.S. Cl. X.R.

182—132, 148